United States Patent
Gold et al.

(10) Patent No.: US 8,781,495 B1
(45) Date of Patent: Jul. 15, 2014

(54) METHOD AND SYSTEM FOR INDOOR RF MAPPING

(76) Inventors: Andrew Joseph Gold, Mountain View, CA (US); Graham Tyler Cantin, Sunnyvale, CA (US); James Eric Greenhaw, Jr., Arroyo Grande, CA (US); Tesh Tesfaye, Woodside, CA (US)

( * ) Notice: Subject to any disclaimer, the term of this patent is extended or adjusted under 35 U.S.C. 154(b) by 161 days.

(21) Appl. No.: 13/457,312

(22) Filed: Apr. 26, 2012

Related U.S. Application Data

(60) Provisional application No. 61/479,390, filed on Apr. 26, 2011.

(51) Int. Cl.
*H04W 24/10* (2009.01)

(52) U.S. Cl.
USPC ..................... 455/456.1; 705/26.61

(58) Field of Classification Search
CPC ... H04W 4/02; H04W 48/12; H04L 29/08657
USPC .............. 455/456.1, 67.11, 67.13; 705/26.61; 342/457
See application file for complete search history.

(56) References Cited

U.S. PATENT DOCUMENTS

| | | | |
|---|---|---|---|
| 5,732,354 A | 3/1998 | MacDonald | |
| 5,848,373 A | 12/1998 | DeLorme et al. | |
| 6,091,956 A | 7/2000 | Hollenberg | |
| 6,167,274 A | 12/2000 | Smith | |
| 7,346,359 B2 | 3/2008 | Damarla et al. | |
| 7,383,051 B2 | 6/2008 | Spain, Jr. et al. | |
| 7,522,049 B2 | 4/2009 | Aljadeff et al. | |
| 7,532,896 B2 | 5/2009 | Friday et al. | |
| 7,664,511 B2 | 2/2010 | Wang et al. | |
| 7,706,814 B2 | 4/2010 | Sillasto et al. | |
| 7,725,111 B2 | 5/2010 | Dressler et al. | |
| 7,768,395 B2 | 8/2010 | Gold | |
| 7,822,426 B1 | 10/2010 | Wuersch | |
| 7,848,765 B2 | 12/2010 | Phillips et al. | |
| 7,899,467 B2 | 3/2011 | Feuerstein et al. | |
| 7,903,029 B2 * | 3/2011 | Dupray .......................... 342/457 |

OTHER PUBLICATIONS

Online data sheet at http://www.aeroscout.com/files/AeroScout%20MobileView%20Data%20Sheet.pdf, 2009, pp. 1 to 2 [as printed].

* cited by examiner

*Primary Examiner* — Phuoc H Doan
(74) *Attorney, Agent, or Firm* — The Noblitt Group, PLLC

(57) ABSTRACT

A method is disclosed for determining a region of highest probability. At a first electronic device an RF signal is received comprising a first wireless signal and a second wireless signal is received. The first wireless signal and the second wireless signal are each other than solely a GPS signal. Based on both the first wireless signal and the second wireless signal, a region of highest probability is determined comprising an area of location estimates for the electronic device, the determined region of highest probability other than a region of highest probability determinable independently with each of the first RF signal and the second RF signal.

23 Claims, 12 Drawing Sheets

METHOD AND SYSTEM FOR INDOOR RF MAPPING

CROSS REFERENCES TO RELATED APPLICATIONS

This application claims the benefit of U.S. Provisional Patent Application No. 61/479,390, filed Apr. 26, 2011, and incorporates the disclosure of the application by reference.

FIELD OF THE INVENTION

The invention relates generally to location analysis and more particularly to RF based position determination.

BACKGROUND

The ability to locate RF devices within a building has long been sought after. Attempts to locate laptops, for example, and tagged devices have been proposed wherein a plurality of wireless receivers each transmit a signal and then try to identify through triangulation, for example, a location of the RF signal source. In one such system, phased array antennas used for each of the wireless receivers allow them to determine angle of incidence of the RF signals. With two receivers, an accurate estimation of transmitter location is possible in a test environment. Unfortunately, in real world environments reflections and other signal distortions result in errors in the location determinations and as such, these systems are problematic in commercial applications.

More recently, RF fingerprinting has been studied wherein a receiver is in motion and transmitted signals received thereby are used to estimate location. It has been found that with one transmitter in a controlled environment, it is possible to accurately estimate location. Unfortunately, like the other prior art, real world applications have eluded this technology for many reasons. First, there is signal reliability issues where noise levels, reflections, interference, weather, speed, receiver battery levels, etc. all affect the results. Second, in highly controlled environments it is easier to assure uniqueness of a received RF signal at every point within the controlled space. Third, controlled environments are highly static whereas the commercial world is not. Fourth, in a controlled environment certain features are excluded as problematic whereas in a commercial application, someone does not want to hear that they need to replace all of their metal fixtures with plastic ones.

It would be advantageous to provide a method and system for supporting commercial indoor RF based location services.

SUMMARY OF EMBODIMENTS OF THE INVENTION

In accordance with an embodiment of the invention there is provided a method comprising: a. receiving at a first electronic device an RF signal comprising a first wireless signal and a second wireless signal, the first wireless signal and the second wireless signal other than solely a GPS signal; and b. based on both the first wireless signal and the second wireless signal, determining a region of highest probability comprising an area of location estimates for the electronic device, the determined region of highest probability other than a region of highest probability determinable independently with each of the first RF signal and the second RF signal.

In accordance with another embodiment of the invention there is provided a method comprising: a. receiving at a first electronic device an RF signal comprising a wireless signal according to a first standard and a wireless signal according to a second standard, the first standard and the second standard other than a GPS standard; b. determining a first region of highest probability estimate for an electronic device based solely on the RF signal and determining a second region of highest probability estimate for the electronic device based solely on the wireless signal; and c. determining the third region of highest probability of the electronic device based on the first region of highest probability and the second region of highest probability.

In accordance with another embodiment of the invention there is provided a method comprising: a. receiving at a first electronic device a first wireless signal according to a first standard and receiving at the first electronic device a second wireless signal according to the first standard at a different time temporally proximate to the first wireless signal; b. determining a first region of highest probability based on the first RF signal and determining a second region of highest probability based on the second wireless signal; and c. determining the third region of highest probability of the electronic device based on the first region of highest probability and the second region of highest probability.

In accordance with another embodiment of the invention there is provided a method comprising: a. receiving at a first electronic device a first wireless signal according to a first standard and receiving at the first electronic device a second wireless signal according to the first standard at a different time temporally proximate to the first wireless signal; b. receiving at the first electronic device a second first wireless signal according to a first standard and receiving at the first electronic device a seconds second wireless signal according to the first standard at a different time temporally proximate to the first wireless signal and second wireless signal; c. determining a first region of highest probability based on the first RF signal and second wireless signal and determining a second region of highest probability based on the second first wireless signal and second second wireless signal; and d. determining the third region of highest probability of the electronic device based on the first region of highest probability and the second region of highest probability.

In accordance with another embodiment of the invention there is provided a method comprising: a. receiving at a first electronic device a first wireless signal according to a first standard and receiving at the first electronic device a second wireless signal according to the first standard at a different time temporally proximate to the first wireless signal; b. receiving at the first electronic device a second first wireless signal according to a first standard and receiving at the first electronic device a second second wireless signal according to the first standard at a different time temporally proximate to the first wireless signal and second wireless signal; c. determining a first region of highest probability based on the first RF signal, a second region of highest probability based on the second wireless signal, a second first region of highest probability based on the second first wireless signal and a second second wireless signal based on the second second wireless signal; and d. determining the third region of highest probability of the electronic device based on the first region of highest probability, the second region of highest probability, the second first region of highest probability, and the second second region of highest probability.

In accordance with another embodiment of the invention there is provided a method comprising: a. receiving at a first electronic device a first wireless signal according to a first standard and receiving at the first electronic device a second wireless signal according to the first standard; b. determining a second measured time based on the difference between a second time associated with the second region of highest probability and a third time associated with a third region of highest probability; c. determining a velocity value; and d. determining a third region of highest probability based on the first wireless signal, the second wireless signal, measured time, and the velocity value.

In accordance with another embodiment of the invention there is provided a method comprising: a. receiving at a first electronic device a first wireless signal and a second wireless signal; b. determining using RF fingerprinting a first region of highest probability based on the first wireless signal; c. determining using RF fingerprinting a second region of highest probability based on the second wireless signal; and d. determining based on the first and second regions of highest probability a third region of highest probability for the electronic device.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
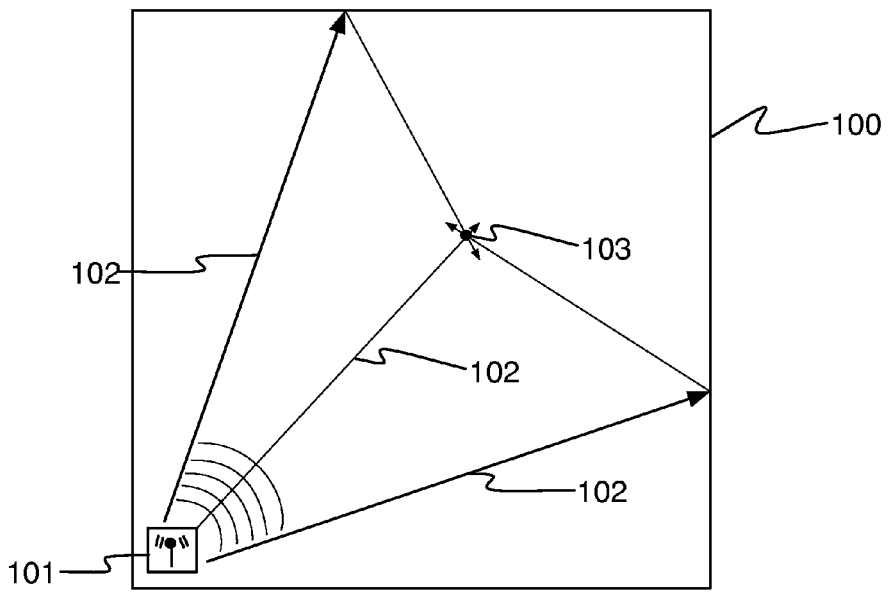
FIG. 1 illustrates a prior art RF Fingerprinting system in a controlled space.

Referring to FIG. 1, shown is a simplified prior art RF fingerprinting system. A controlled space 100 is defined in which RF signals provide a level of unique location identification. Controlled space 100 has sufficient reflectivity to support some small level of signal reflection and multipath. At a corner of controlled space 100 is disposed transmitter 101. Transmitter 101 is an RF signal transmitter according to a known protocol such as 802.11. At 102 are shown a plurality of signal paths for a signal transmitted and each reaching a same destination point 103. As will be appreciated, a propagation time for each of said signals 102 may differ and, as such, the data content of the signals reaching point 103 at an instance of time indicate information relating to propagation time and therefore relating to path length. Thus, when a transmitted RF signal transmitted from transmitter 102 is of common signal strength, the RF signals received at each and every location differ and can be used to identify each location uniquely. Conversely, even when transmitter 102 transmits at different signal levels, it is possible to uniquely identify each location based on a ratio of signal strength between different received signals.

Figure 2:
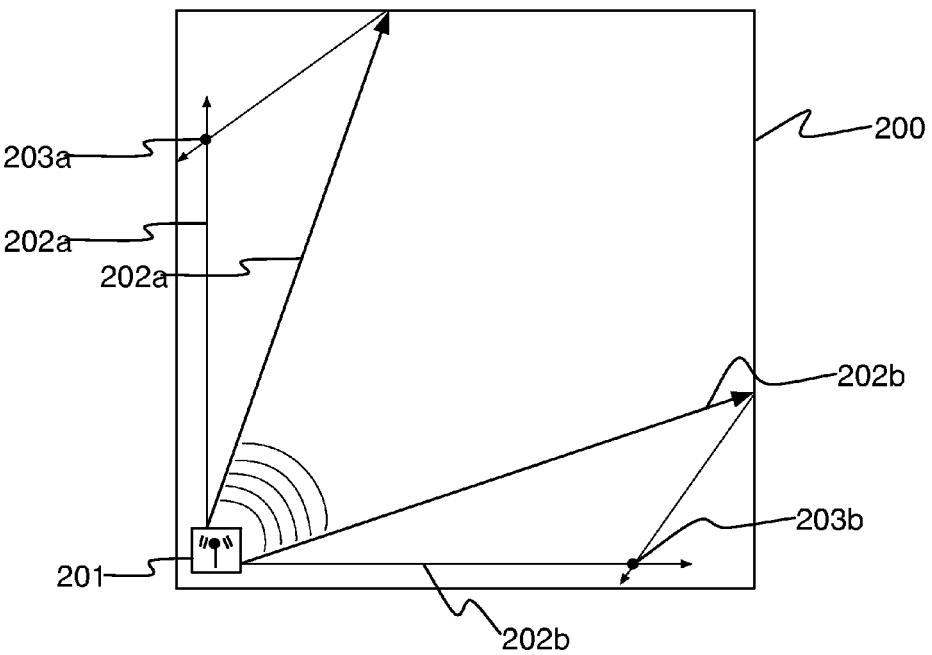
FIG. 2 illustrates a prior art RF Fingerprinting system in an uncontrolled space.

Referring to FIG. 2, shown is a same RE fingerprinting system as that of FIG. 1 wherein the space 200 is uncontrolled. Space 200 has sufficient reflectivity to support some small level of signal reflection and multipath. At a corner of controlled space 200 is disposed transmitter 201. Transmitter 201 is an RF signal transmitter according to a known protocol such as 802.11. At 202a and 202b are shown a plurality of signal paths for a signal transmitted and each reaching a destination point 203a and 203b, respectively. Thus, when a transmitted RF signal transmitted from transmitter 202 is of common signal strength, the RF signals received at 203a and at 203b are same and cannot be used to identify each location uniquely. The space is bisymmetrical and as such, each unique RF fingerprint is not unique and leads to two possible location estimates.

Figure 3:
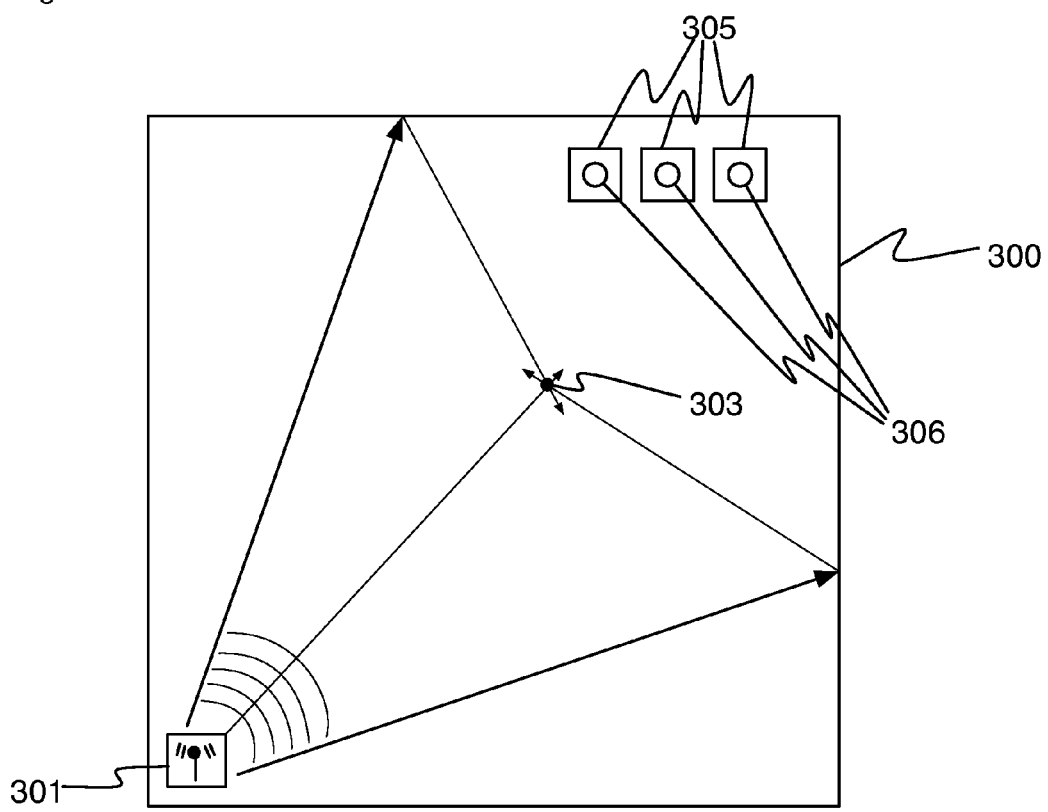
FIG. 3 illustrates a prior art RF Fingerprinting system in an uncontrolled space.

Referring to FIG. 3, shown is another uncontrolled space 300. Uncontrolled space 300 is of unknown reflectivity. At a corner of uncontrolled space 300 is disposed transmitter 301. Transmitter 301 is an RF signal transmitter according to a known protocol such as 802.11. At 302 shown are a plurality of signal paths for a signal transmitted and each reaching a same destination point 303. As will be appreciated, a propagation time for each of said signals 302 may differ and, as such, the data content of the signals reaching point 303 at an instance of time indicate information relating to propagation time and therefore relating to path length.

Here, fixtures 305 in the form of metal shelving units are disposed within the space and merchandise 306 is added to and removed from the metal-shelving units. Thus, an RF signal received on one day differs significantly from an RF signal received on another day. Thus, the prior art RF fingerprinting methodology fails except in very specific and controlled situations. Further, though the system may lend itself to accurate results at some points in time, identifying those results as accurate is based on human operator control of the space 300 as opposed to the system itself.

Figure 4:
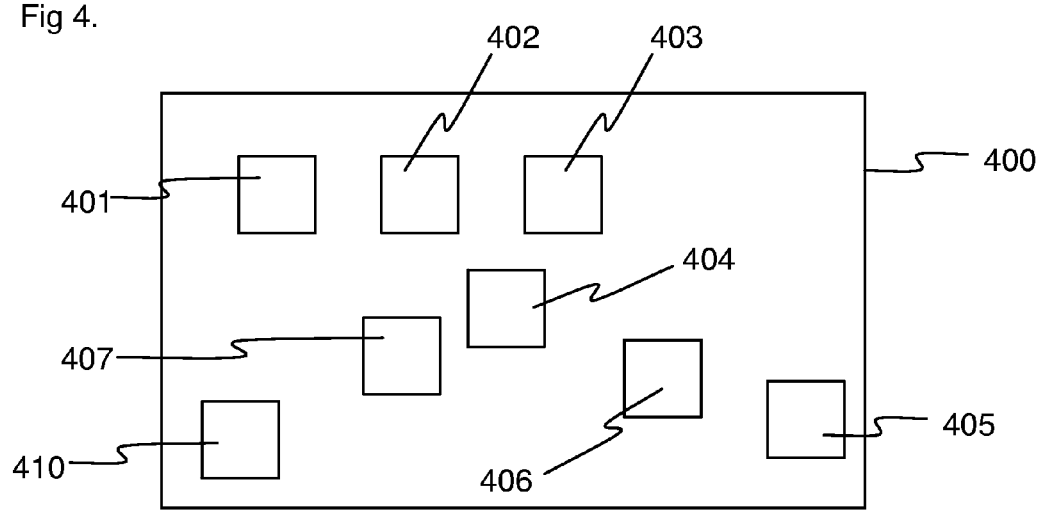
FIG. 4 is a block diagram of an RF data capturing system in an uncontrolled space.

Referring to FIG. 4, shown is a simplified block diagram of a system for capturing RF data for characterizing an uncontrolled space. System 400 is shown comprising a plurality of components including the following: a location sensor in the form of dead reckoning system 401, an RF sensor in the form of WiFi antenna 402, a second RF sensor in the form of Bluetooth® antenna 403, a third RF sensor in the form of cellular data signal sensor 404, a fourth RF sensor in the form of a 3G cellular data signal sensor other similar function cellular data signal sensor 405, a memory circuit 406 and a processor 407. For example, memory circuit 406 comprises a removable memory circuit such as a USB key. Alternatively, the memory circuit is replaced by a communication circuit for communicating the data from system 400 to a server for storage. Optionally, the system is implemented on a rolling cart to facilitate moving of the system inside a space. Further optionally, system 400 comprises GPS receiver 410 for indicating a geo-location when outside of the space.

Figure 5:
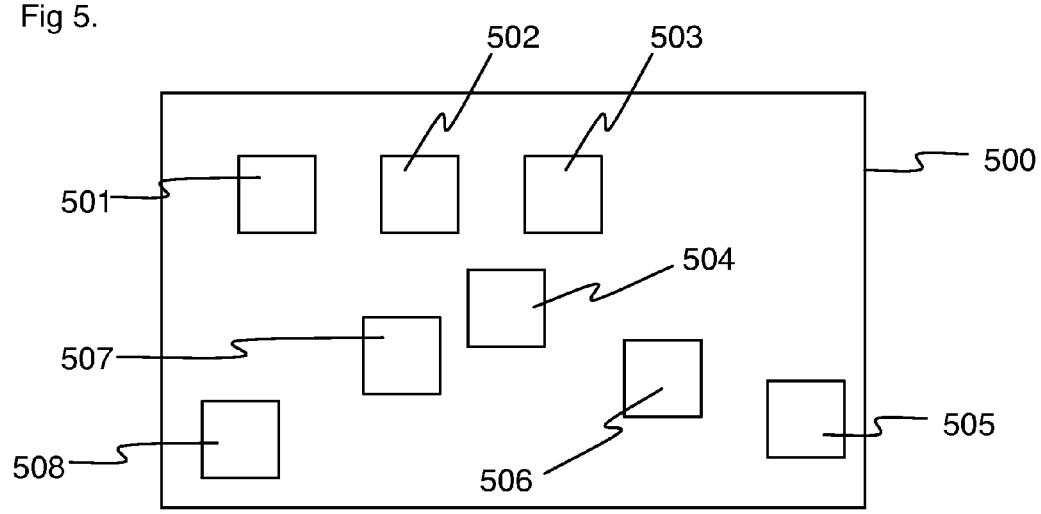
FIG. 5 is a block diagram of an RF data capturing system in an uncontrolled space.

Referring to FIG. 5, shown is a simplified block diagram of a system for capturing RF data for characterizing an uncontrolled space. System 500 is shown comprising a plurality of components including the following: a location sensor in the form of dead reckoning system 501, an RF sensor in the form of WiFi antenna 502, a second RF sensor in the form of Bluetooth® antenna 503, a third RF sensor in the form of cellular signal sensor 504, a fourth RF sensor in the form of a 3G cellular data sensor or other similar function cellular data signal sensor 505, a memory circuit 506 and a processor 507. For example, memory circuit 506 comprises a removable memory circuit such as a USB key. Alternatively, the memory circuit is replaced by a communication circuit for communicating the data from the system 500 to a server for storage. Optionally, the system is implemented on a rolling cart to facilitate moving of the system inside a space. Further optionally, the system 500 comprises GPS receiver 510 for indicating a geo-location when outside of the space.

The system 500 further comprises a port for coupling with portable wireless communication devices in the form of cellular phones, smart phones, mobile tablets, and mobile modems 508. Of course, other wireless devices are also contemplated for use with the system 500. Thus for example, the system 500 is implemented with an Android® smart phone, an iPhone®, a Blackberry® phone, a Windows® 7 phone, etc. each sensing RF signals and providing the data to the system 500 for storage.

Figure 6:
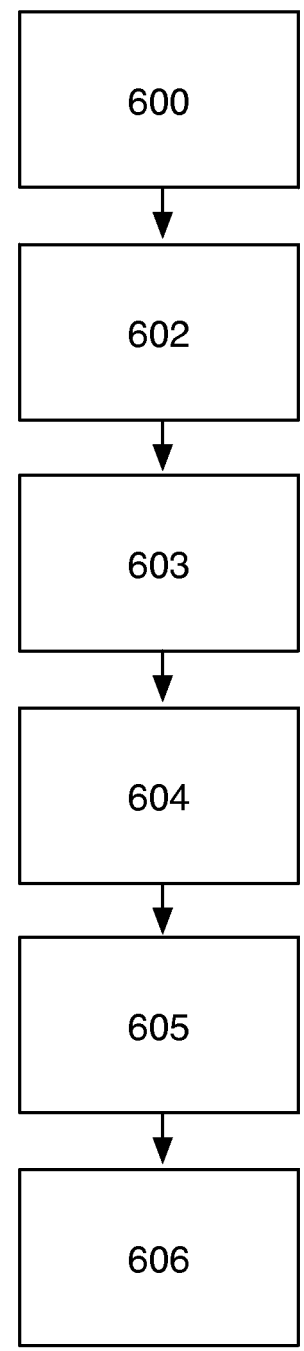
FIG. 6 is a flow diagram of a system for mapping locations based on RF signal data.

Referring to FIG. 6, shown is a simplified flow diagram of a system such as that shown in FIG. 5 used for mapping of locations based on RF signal data. The system is set up and powered for use at an outside location at 600. The system provides an indication of GPS signal reception at 602. At this point, a reasonably accurate location is known for the system 500. At 603, the system is wheeled into the space in the form of a shopping mall. The system is provided with a dead reckoning system 501 and, as such, provides an indication from the dead reckoning system 501 of actual motion and location of the system 500. At 604, the system is moved through a path. The path is preferably selected to be short enough to allow for relatively small dead reckoning system error while being long enough to maintain a level of efficiency in data gathering. Throughout the movement of 604, the system iteratively senses RE signals and provides the signal data and the dead reckoning data for storage 605 within memory circuit 506. Alternatively, the data is transmitted via a wireless data communication signal to a server for storage thereby. Though the system is described with a collection of raw data from the RF receivers, it is also possible to preprocess the data before storage thereof. That said, storage of more raw data is useful in improving and maintaining of a data set so formed. The process continues until 606 where the system is returned to a location where a GPS signal is received and a clear indication of location is thereby achieved.

Once a path is traversed, the process is repeated for numerous other paths within a same space. This allows for characterization of a space by capturing data relating to RF signals received at each of a plurality of interior locations and storing the data in association with known location data based on dead reckoning and/or GPS data. Thus, a same system is also usable to form an RF map of an outdoor space. Combining the data captured from the plurality of paths results in a map of the interior space of the building and keeps the error introduced by the dead reckoning system to a minimum. Alternatively the system traverses the building once to capture the data.

Once sufficient data is captured, then processing of the data to characterize the space is supported. Of course, processing could occur during capture, after capture, or during use of the data depending on the system requirements, performance, and other design criteria. Optionally, mapping the location based on RF signal data is repeated wherein acquiring more RF data increases the amount of location data and therefore presents further opportunity for resolving errors or processing of unknown RF fingerprint data to determine a location.

Once the raw data is uploaded from the dead reckoning system to the server it is processed. Alternatively the data is transferred to the server via the removable memory circuit comprising the raw data, for example a USB key. Further alternatively, the data is preprocessed prior to being transferred to a database. The dead reckoning data and the GPS data are made consistent. This involves evaluating an error vector for the dead reckoning data and applying a corrective function to the location data within the raw data in order to result in corrected location data. When an error vector is very small, correction is other than applied. Of course, in an error vector determination, known imprecision in GPS positioning is optionally taken into account.

Once the location data is corrected for each path traversed, the RF communication signals for each different RF signal source, Bluetooth® transmitter, WiFi transmitter, Cellular transmitter, 3G data signal transmitter, 4G data signal transmitter, and other similar function data signal transmitters are each characterized independently to determine RF fingerprints associated with each location, and to identify RF fingerprinting issues such as non-unique RF fingerprints and noisy environments. Thus, a resulting data set comprising a plurality of RF fingerprints for each of a plurality of locations results.

Figure 7:
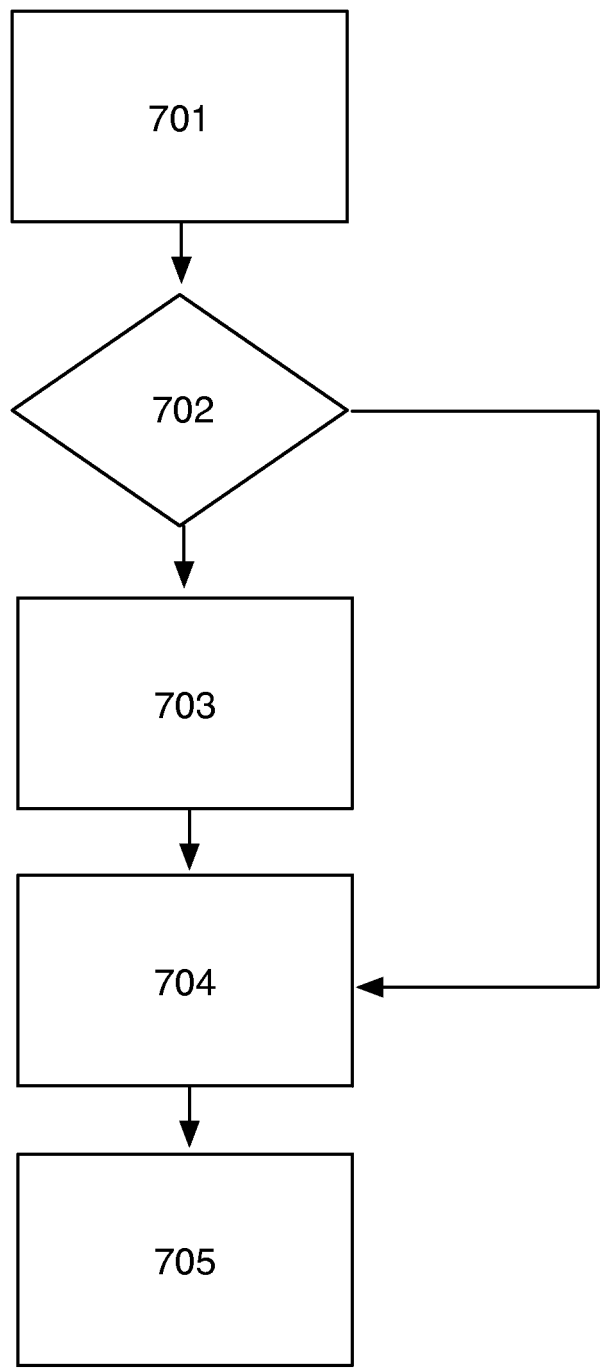
FIG. 7 illustrates a flow diagram of processing data collected by a system for mapping locations based on RF signal data.

FIG. 7 illustrates a flow diagram of processing data collected by the dead reckoning system by the server. Once the raw data has been uploaded from the dead reckoning system, for example via a WiFi data communication network, the raw data is processed at 701. The server evaluates an error vector for the dead reckoning system at 702. When the error vector is sufficiently large but not too large, a corrective function is applied to the location data wherein the location data is corrected for errors at 703. When the error vector is very small, a corrective function is other than applied to the location data. Typically, a very small error is one that is within a predetermined tolerance for location errors for the system. When an error is very large, the data is preferably discarded and new data is captured in an attempt to acquire better source data. Optionally, an indication of data collection error is provided. The RF signals from each signal source are characterized and an RF fingerprint is determined for each signal source correlated to a location in the path traversed 704. The RF fingerprints, associated locations, and error margins are stored in database memory at 705.

Figure 8:
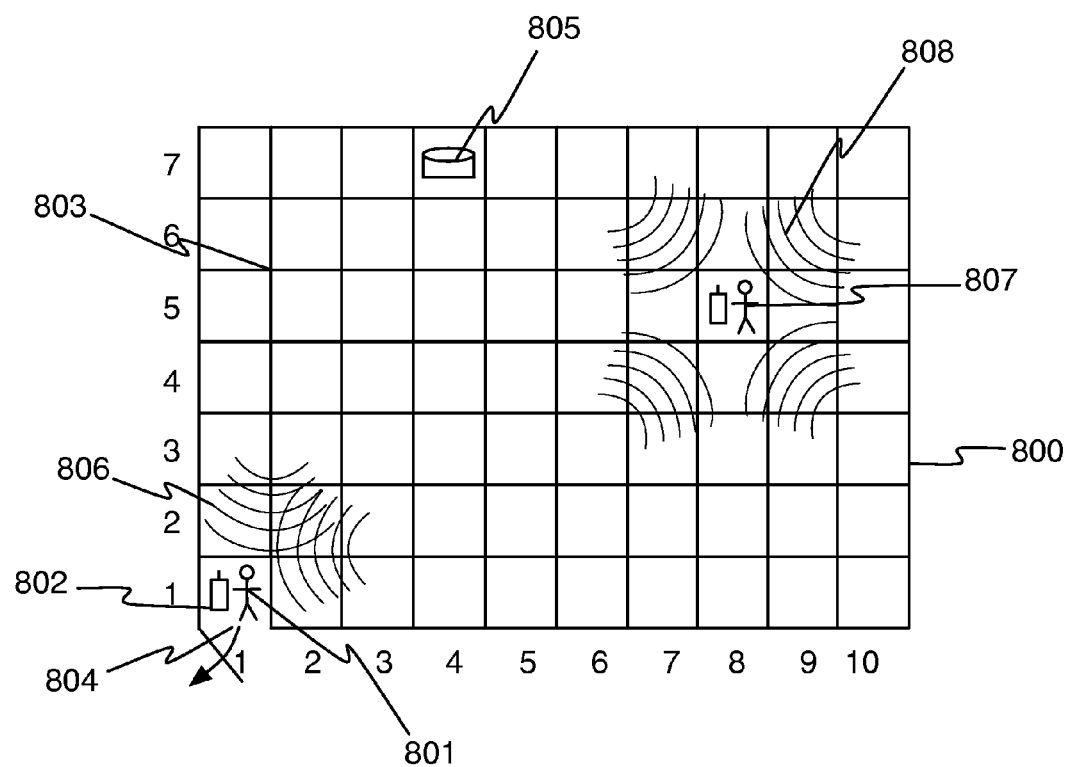
FIG. 8 is a diagram for illustrating location estimation for a device comprising an RF signal receiver circuit.

According to an embodiment of the invention a location of a device comprising an RF signal receiver circuit is often determinable by the relationship of RF fingerprint data and the associated location data. FIG. 8 is a simplified diagram for illustrating location estimation for such a device. A person 801 carrying a smart phone 802 enters a building 800 wherein RF fingerprint data and location data have been captured, for example using the method of FIG. 7. Grid 803 indicates locations within the building. The person 801 stops at the entrance 804. The smart phone 802 is in communication with a server 805 via a Local Area Network (LAN). The server 805 comprises a dataset including corrected location data and RF fingerprints relating to an interior of the building, and provides location information to the smart phone 802 in response to RF signal data. The smart phone 802 comprises a WiFi communication circuit and a 3G data communication circuit for receiving RF signals 806 and collects RF signal data for the WiFi communication signal and 3G data communication signals. The smart phone 802 provides data relating to the WiFi communication signal and the 3G data communication signal to server 805. In conjunction with the location data and RF fingerprints for the building 800 the server 805 determines a first location estimate relating to the WiFi communication signal data at coordinates (1,1). The server 805 processes the 3G data communication signal data in conjunction with the location data and RF fingerprints of the building 800 and determines a second location estimate at coordinates (1,1). The location determined based on the independent RF signals, WiFi communication signals and 3G data communication signals, indicate the same coordinates confirming that (1,1) is likely a location of person 801. The person 801 notes the location (1,1). As the person proceeds walking through the building 800 the server continuously receives WiFi communication signal data and 3G data communication signal data from the smart phone 802 and determines the smart phone's the most likely location along the path traversed. As the building 800 is large and difficult to navigate, when is it is time to leave the building the person 801 refers to the smart phone 802 to determine the present location in order to navigate to the entrance at coordinates (1,1).

At the person's present position the server 805 receives the WiFi communication signal data and 3G data communication signal data from smart phone 802 to determine the smart phone's most likely location. In conjunction with the location data and RF fingerprint data for the building 800, the server 805 determines a first location estimate relating to the WiFi communication signal data, for example at coordinates (5,8) as shown. The server 805 processes the 3G data communication signal data in conjunction with the location data and RF fingerprint data for the building 800 and determines a second location estimate, for example at coordinates (4,7). The data provided by the WiFi communication signal and the 3G data communication signal provide two different location estimates indicating at least one result is incorrect. The results are optionally stored in server memory. The server 805 continues to receive new WiFi communication signal data from the smart phone 802. The server 805, processes the new WiFi communication signal data with the previous WiFi communication signal data, to resolve errors in location estimates based on the new WiFi communication signal data and previous WiFi communication signal data, and updates the previous and new location estimate. This iterative process of collecting and processing new data, resolving errors between the new data and previous data, and updating a location estimate, is repeated at predetermined intervals. Alternatively, the intervals are determined based on a convergence of the error. Further alternatively, the intervals are other than predetermined. Typically, this process is iterated until the resulting error is below a predetermined threshold error. The server 805 continues to receive other new 3G data communication signal data from the smart phone 802. The server 805, processes the other new WiFi communication signal data with the previous new 3G data communication signal data, to resolve errors in location estimates based on the new 3 G communication signal data and previous 3 G communication signal data, and updates the previous and new location estimate. Thus, an iteration is completed and another iteration is optionally commenced. During this process, signal data, associated location data, and associated errors are stored in a dataset in server memory. Once the errors are resolved for the WiFi communication signal data and the 3G data communication signal data, the location estimates from both sources are processed and a location estimate for the smart phone is determined, for example at coordinates (5,8) as shown. Optionally, the RF communication signals are Bluetooth®, 4G or later cellular data signals, other RF signals, and are other than a GPS signal. Optionally the device is a cell phone, tablet, laptop, PDA, or other device comprising at least a receiver circuit for receiving RF signals according to each of at least two standards. Typically, this is achieved using at least two RF signal receiver circuits.

Alternatively, the determined location estimate based on the WiFi communication signal data and associated location data is (3,3) and the location estimate based on the RF communication signal data and associated location data is (4,7). The WiFi communication signal data and the 3G data communication signal data do not correlate to the same location. The iterative process of collecting and processing new WiFi communication signal data, to resolve errors between the new WiFi communication signal data and previous WiFi communication signal data, does not result in an error below a predetermined threshold error. The iterative process of collecting and processing new 3G data communication signal data, to resolve errors between the new 3G data communication signal data and previous 3G data communication signal data, also does not result in an error below a predetermined threshold error. A location estimate relating to each independent source is not reliable; hence RF signal data from both sources are used to determine a location estimate. An iterative process is used to resolve the errors in each signal in a compatible fashion such that determining a location estimate results in an approximately compatible error for both estimations. For example, using an analytic process it can be determined that certain forms of error inducing events induce different but predictable errors in different signals. More particularly, for example, a metal panel predictably attenuates signals propagating therethrough and reflects signals propagating thereto. As such a metal plate placed between the device location and a transmitter but not between the device location and another transmitter and also disposed close to the device location, will induce predictable error in each location estimate that is resolvable in a compatible fashion once a cause of the error is selected as a metal object or plate. Further, when data is captured at different times within a limited timeframe, the inter-relation between adjacent locations and the errors and compatible causes of the error, further allows for error resolution. Optionally, the RF communication signals are Bluetooth® signals, 4G or later cellular data signals, other RF signals, and are other than a GPS signal. Optionally the device is a cell phone, smart phone, tablet, laptop, or other device comprising at least a receiver circuit for receiving RF signals according to each of at least two standards. Typically, this is achieved using at least two RF signal receiver circuits.

Figure 9:
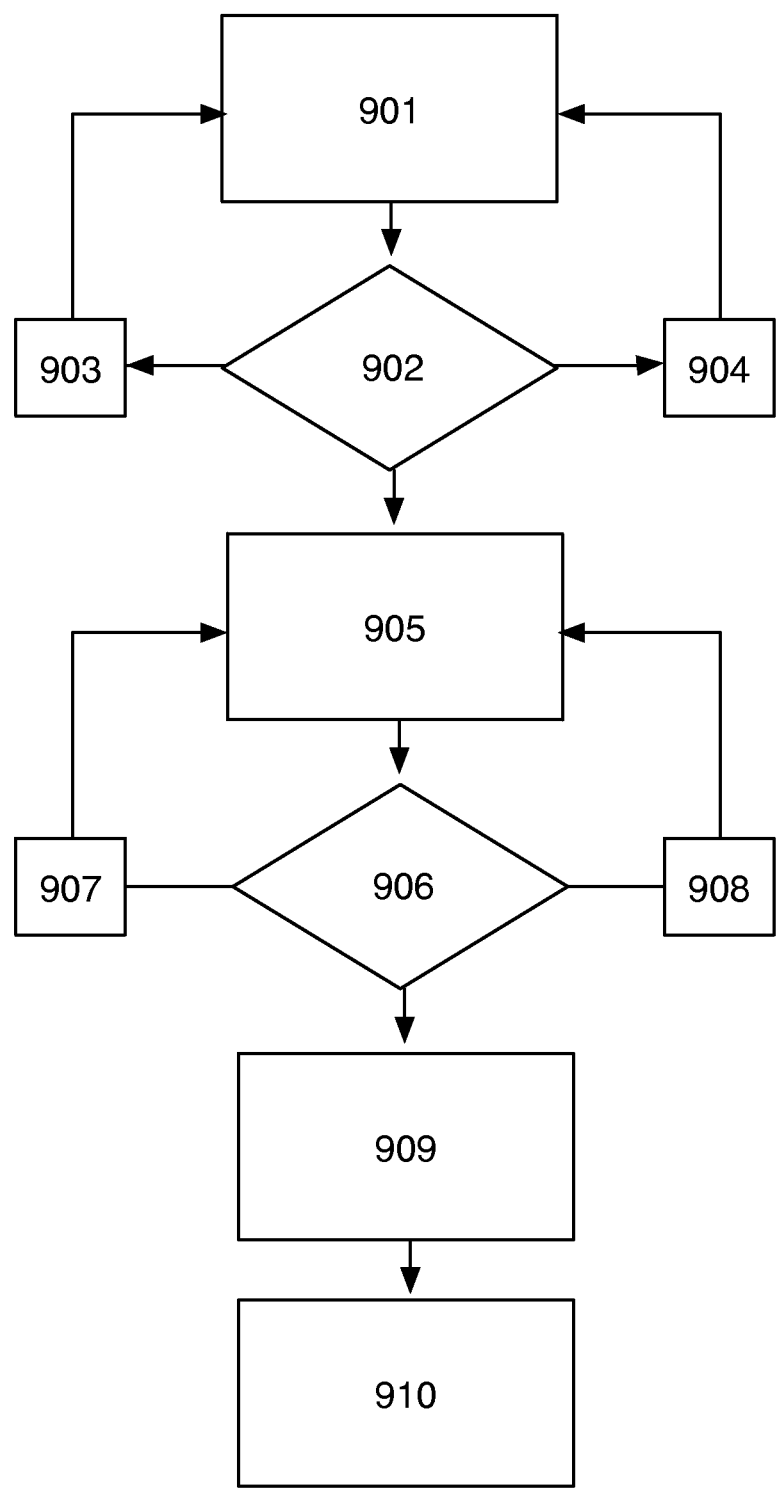
FIG. 9 is a flow diagram of the process executed by the server to resolve errors from two independent wireless signal data sets to estimate a single location of a device.

FIG. 9 is a flow diagram of the process executed by a server to resolve errors from two independent RF signal data sets to estimate a single location of a device, for example a device comprising at least a receiver circuit for receiving RF signals according to each of at least two standards. The two independent RF signal data sets are in the form of a WiFi communication signal data and 3G data communication data from a device in the form of a smart phone comprising a WiFi communication circuit and a 3G data communication circuit. The server receives WiFi communication signal data from the smart phone and determines a location estimate based on the WiFi communication signal data at 901. The server determines an error value for the location estimate based on other location estimates determined temporally proximate the location estimate. At 902, it is determined if error is below a predetermined error threshold or if the location estimate is valid—lies within a useful range of location estimates. If it is determined that the error is not below a predetermined error threshold and that the location estimate is valid, the WiFi communication signal data, associated location data, and error data are stored in a data set in memory at 903 and step 901 is iterated and, using the previous WiFi communication signal data and associated location data, as well as new WiFi communication signal data and associated location data the server updates the previous and new location estimate. At 902 the server again determines if the error is below a predetermined error threshold or if the location estimate is valid. Optionally when the data is invalid, the invalid location estimate and associated location information are stored in a second data set, 904, and the process returns to 901. At 901 the server continues to iterate gathering data and updating the location estimate until the error is below a predetermined error threshold. Clearly, when the smart phone is moving, the updating of location estimates involves updating of location estimates for a moving object based on known potential paths of motion and, as such, is not updating a same location each iteration, but instead trying to update a location based on a determined and feasible path of motion.

At step 905 the server receives 3G data communication signal data from the smart phone and determines a location estimate based on the data at step 906. At 906, it is determined if error is below a predetermined error threshold or if the location estimate is valid—lies within a useful range of location estimates. If it is determined that the error is not below a predetermined error threshold and that the location estimate is valid, the 3G data communication signal data, associated location data, and error data are stored in a data set in memory at 907 and step 905 is iterated and, using the previous 3G data communication signal data and associated location data, as well as new 3G data communication signal data and associated location data the server updates the previous and new location estimate. At 906 the server again determines if the error is below a predetermined error threshold or if the location estimate is valid. Optionally when the data is invalid, the invalid location estimate and associated location information are stored in a second data set, 908, and the process returns to 905. At 905 the server continues to iterate gathering data and updating the location estimate until the error is below a predetermined error threshold. Clearly, when the smart phone is moving, the updating of location estimates involves updating of location estimates for a moving object based on known potential paths of motion and, as such, is not updating a same location each iteration, but instead trying to update a location based on a determined and feasible path of motion. At 909 the server determines the most likely location of the smart phone. The RF fingerprint data and associated errors are stored in memory at step 910. Optionally, the RF communication signals are Bluetooth® signals, 4G or later cellular data signals, other RF signals, and are other than a GPS signal. Optionally the device is a cell phone, smart phone, tablet, laptop, PDA, or other device comprising at least a receiver circuit for receiving RF signals according to each of at least two standards. Typically, this is achieved using at least two RF signal receiver circuits.

Figure 10:
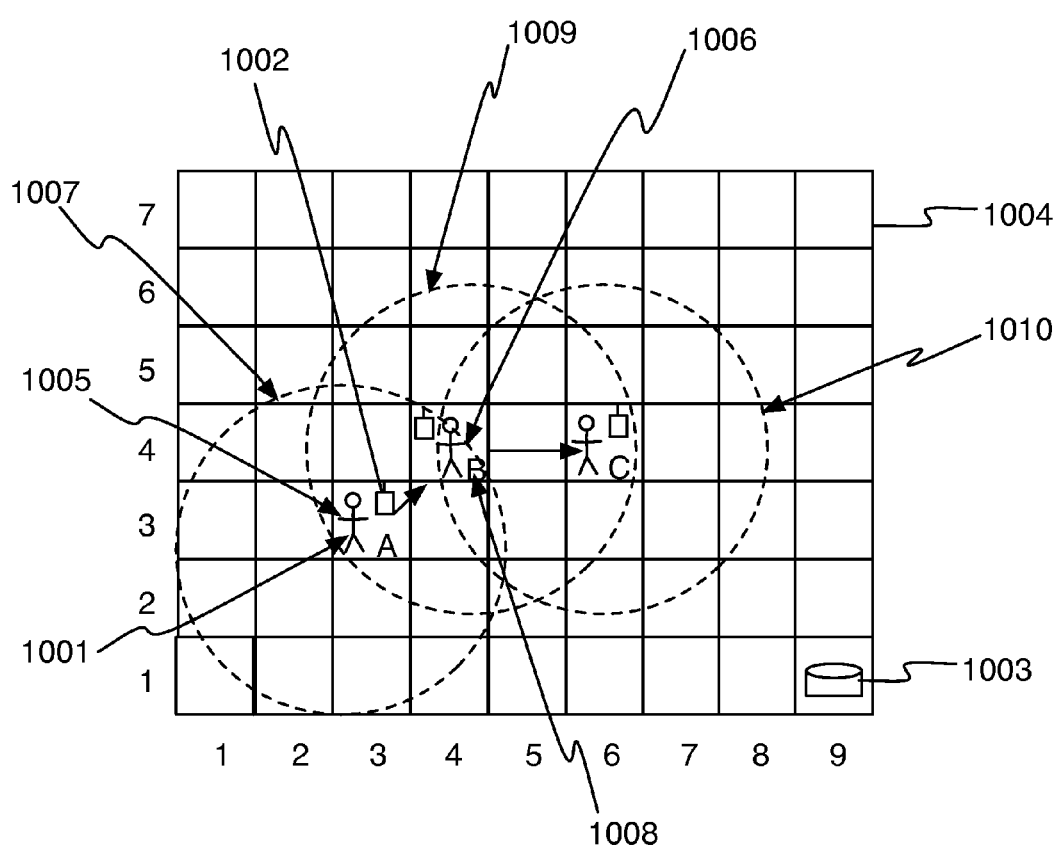
FIG. 10 is a diagram for illustrating determining a location of a device comprising RF signal receiver circuits by the relation of RF signal data, the associated location data, previous RF signal data and previous location data.

According to an embodiment of the invention a location of a device comprising RF signal receiver circuit is often determinable by the relation of RF signal data, the associated location data, previous RF signal data and previous location data. Referring to FIG. 10, a user 1001 with a device comprising receiver circuit for receiving RF signals according to each of at least two standards, such as a smart phone 1002, for receiving RF signals in the form of Bluetooth® communication signals and WiFi communication signals enters building 1004 wherein location data and RF Fingerprint data has been collected and is stored in memory of server 1003. Utilizing the Bluetooth® communication signal data and the WiFi communication signal data the server 1003 estimates the user's location at A (3,3) 1005. The signal data from both sources and the associated location data are stored in a data set in the server's memory. The user moves from location A 1005 to location B 1006. At a preselected interval of time, for example 1 second, the server again gathers data from both signal sources and attempts to determine an estimate for location B. In that one second the user does not move a great distance from location A. In fact the server defines a region of space in which the user is most likely to be located. This region of highest probability (RHP) from location A is shown in FIG. 10 as 1007. The location estimate relating to the Bluetooth® signal data is (7,9) and location estimate relating to the WiFi communication signal data is (4,3). The location (7,9) is out of the RHP from location A 1007 and is therefore most likely incorrect; hence the Bluetooth® signal data is most likely in error. RHP evaluation and comparison aids in providing a more accurate location estimate of the location of the smart phone 1002 as the Bluetooth® signal data does not heavily influence the final location determination process. The server includes the RHP from location A 1007 and resolves the error, determining an estimate for location B 1008 at (4,4). The Bluetooth® and WiFi signal data, RHP from location A and location data are stored in a dataset in server memory. Also shown in FIG. 10 are the RHPs from location B 1009 and location C 1010. This process is repeated through out a path traversed by the user. Using RHP analysis allows for resolution of paths traversed even when multiple errors are present since a given wireless data set often resolves to few or one possible solution. Optionally, the RF communication signals are WiFi signals, 3G cellular data signals, 4G or later cellular data signals, other RF signals, and are other than a GPS signal. Optionally the device is a cell phone, tablet, laptop, PDA, or other device comprising at least a receiver circuit for receiving RF signals according to each of at least two standards. Typically, this is achieved using at least two RF signal receiver circuits.

According to an embodiment of the invention, a disturbance influencing all RF signals is detected whereby a common error is determinable and correctable. For example, a user with an iPad® is walking through a building wherein an RF fingerprint data and location data have been previously captured. The server continuously updates and transmits location estimates to the iPad. A large metal container has been moved into the building after collection of the RF fingerprint data and location data and therefore the server does not have updated RF fingerprint data for the location, most notably near the metal container. When the user walks close to the metal container the RF signals received by the iPad likely correlate poorly with the previously captured data. The server comprises behavior models that model the effect of known objects on a set of RF signals. Based on the nature of the RF signal data from each source, the server predicts which object is most likely causing interference with all RF signals and applies a compensation function to minimize the effects when determining a location estimate. Optionally, the RF communication signals are Bluetooth® signals, WiFi signals, 3G cellular data signals, 4G or later cellular data signals, other RE signals, and are other than a GPS signal. Optionally the device is a cell phone, tablet, laptop, PDA, or other device comprising at least a receiver circuit for receiving RF signals according to each of at least two standards. Typically, this is achieved using at least two RF signal receiver circuits. Alternatively the object comprises plastics, organic materials, including humans, liquids, man made materials, and naturally existing materials.

According to an embodiment of the invention a disturbance influencing at least one RF signal is detected and a differential error is determined and corrected. For example, a user with a mobile tablet in the form of an iPad® is walking through a building wherein RF fingerprint data and location data have been captured. The server continuously updates and transmits location estimates to the iPad®. A large wooden container has been moved into the building after collection of the RF fingerprint data and location data by the system, therefore the server does not have RF fingerprint data for the location, most notably near the wooden container. When the user walks close to the wooden container at least one of the RF signals received by the iPad®, for example the Bluetooth® signal, are uncorrelated with the RF fingerprint data previously collected and stored. The server comprises behavior models that model the effect of known objects on RF signals. Based on each of RF signals the server predicts which object is most likely causing noted discrepancies and applies a compensation function to minimize the effects for determining a location estimate. For example the server processes each of the signal data and predicts that wood is affecting a behavior of the Bluetooth® signal. Applying a compensation function to the Bluetooth® signal data the effect of the wood is reduced thereby rendering the Bluetooth® signal data functionally useful for determining the estimated location of the iPad. Optionally, the RF communication signals are WiFi signals, 3G cellular data signals, 4G or later cellular data signals, other RF signals, and are other than a GPS signal. Optionally the device is a cell phone, tablet, laptop, PDA, or other device comprising at least a receiver circuit for receiving RF signals according to each of at least two standards. Typically, this is achieved using at least two RF signal receiver circuits. Alternatively the object comprises metals, plastics, organic materials, including humans, liquids, man made materials, and naturally existing materials.

According to an embodiment of the invention RF signals for each different RF signal source, Bluetooth® transmitter, WiFi transmitter, Cellular transmitter, 3G data signal transmitter, 4G data signal transmitter, and other similar function data signal transmitters are each characterized independently, by coupling said devices to the system as described in FIG. 4, to determine RF fingerprint data associated with each known device, associated location data, and to identify RF fingerprinting issues such as non-unique RF fingerprints and noisy environments. Thus, a resulting data set for each known device comprising a plurality of RF fingerprints for a plurality of locations results. Similar to the previously noted embodiment for differential error determination, each device potentially receives signals differently and may impose error on the received signal data. Though the error is also characterizable in use and a data set is determinable to reduce the error for a given device dynamically, there are advantages to characterizing the RF fingerprint data error for different devices through data capture and RF fingerprint data collection.

Known devices include but are not limited to iPhone®, iPad®, Windows 7 Smart Phones®, Android® smart phones, and Blackberry Smart Phones® as well as iPods®, iPads®, mobile tablets, laptops, and PDAs. The properties of the RF signal communication circuitry for each known device vary; therefore, generating a unique dataset of RF fingerprints for each device is beneficial. One of skill in the art easily sees the advantage of employing the unique data sets when estimating a location of a known device. For example, a person carrying an iPhone and walking into a building wherein iPhone RF fingerprint data and location data has been captured is more easily located based on a data set captured with a same device—an iPhone®. The server communicates with the iPhone via a LAN, discovers that the device is an iPhone, and uses the RF fingerprint data relating to iPhones® when estimating a location of the iPhone®. The RF signal data transmitted from the iPhone to the server likely more closely resembles the data in the iPhone RF fingerprint dataset than RF fingerprints for another device. Resulting in more accurate location estimations and less error to correct.

Figure 11:
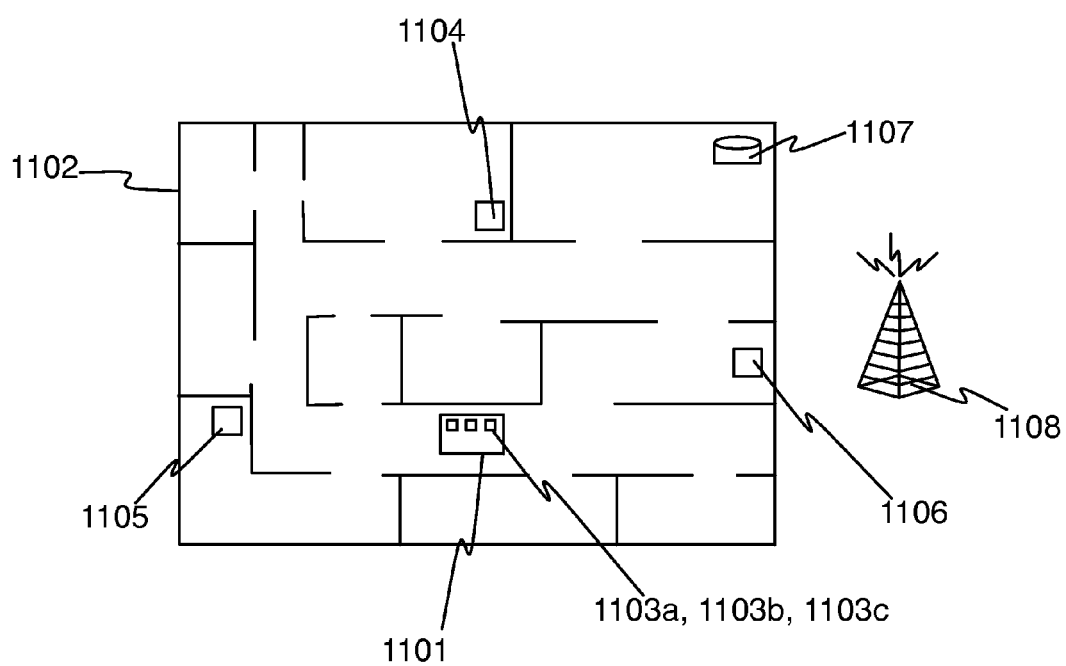
FIG. 11 illustrates a plurality of known devices collecting RF fingerprint data for a building to determine a location estimate for a mobile device.

According to an embodiment of the invention a plurality of known devices that comprise RF signal communication receiver circuits collects RF Fingerprint data for a building to determine a location estimate for a mobile device comprising an RF signal receiver circuit disposed within the building. Similar to the system and method described in FIG. 5 and FIG. 6, a dead reckoning system traverses paths within the building for collecting location data. However, the dead reckoning system does not receive RF signals or transmit RF signal data to a server, but comprises mobile devices comprising RF signal communication transmitter circuits for transmitting RF signals of different standards. As the dead reckoning system traverses paths within the building, known devices disposed within communication range of the building detect the RF signals transmitted from the mobile devices and transmits correlating RF signal data to a server with which they are in communication, for example via a LAN. FIG. 11 illustrates a dead reckoning system 1101 traversing a building, for example a shopping mall 1102. Coupled to dead reckoning system 1101 are mobile devices in the form of a smart phone 1103a, tablet 1103b, and PDA 1103c. In the mall interior are known devices in the form of WiFi switch 1104, WiFi switch 1105, and laptop 1106, and are in communication with server 1107 via a LAN. Disposed outside the mall is a known device in the form of a cell tower 1108 and is in communication with server 1107 via a cellular data communication system. As the dead reckoning system traverses through the mall stores and corridors it transmits location data to server 1107. Simultaneously, WiFi switch 1104, WiFi switch 1105, and laptop 1106 detect RF signals transmitted from the smart phone 1103a, tablet 1103b, and PDA 1103c in the form of WiFi signals and transmits WiFi communication signal data to server 1107. Also, cell tower 1108 detects RF signals transmitted from the smart phone 1103a and PDA 1103c in the form of 3G data cellular signals and transmits 3G cellular data communication signal data to server 1107. This method of collecting RF fingerprint data and associated location data obviates the need for the smart phone 1103a, tablet 1103b, and PDA 1103c to transmit any RF fingerprint data to server 1107. Optionally, the RF communication signals are Bluetooth® signals, 3G cellular data signals, 4G or later cellular data signals, other RF signals, and typically other than a GPS signal. Optionally the device is a cell phone, tablet, laptop, PDA, or other device comprising at least a receiver circuit for receiving RF signals according to each of at least two standards. Typically, this is achieved using at least two RF signal receiver circuits.

A person skilled in the art will see that acquiring RF fingerprint data and associated location data as described in FIG. 11 lends itself to the embodiments described above.

Using a system such as that described in FIG. 4, a database of RF fingerprints and locations is formable. For example, the dead reckoning system is rolled through an indoor location as described hereinabove. Upon traversing a path, an error in dead reckoning is determined and is distributed along the path according to any of a number of known statistical models. The locations are then stored along with their associated RF fingerprint data for each of a number of different communication standards. When two paths overlap or cross, data is collected for one or more locations more than once and a resolution process is employed to resolve between the two different data sets. Preferably, the resolution process aids in correcting errors in one or both datasets, for example in more accurately correcting dead reckoning system error. Alternatively, the resolution process involves more complex processes for trying to determine changes in the environment between data collection times—for example, additional pedestrian traffic. Yet further alternatively, video data is captured with the RF fingerprint data and is used to resolve between different conflicting data. The RF fingerprint data and location data, once assembled into a single dataset, form a map. Locations between locations for which data has been collected are determined or mapped based on analytical methods for determining RF signals in intervening locations for each of the RF signal standards measured. By using an altimeter within the data-gathering device, it is possible to account for errors resulting from movement up or down as are known to occur. For example, in traversing a ramp up and down, a dead reckoning system will determine a distance travelled but location only varies along the horizontal direction—two vectors of the three in three-space. Thus, a greater distance may actually be travelled without an actual error having occurred in the dead reckoning system measurement. Clearly the data set, once collected, is augmentable at intervals or continuously to provide more accurate data and data relating to variations in a given environment. For example, traversing a new path each night once a shopping mall is closed, allows the intervening space within the mall to be mapped over time thereby reducing a distance between measured data points for use in analyzing intervening spaces for a given dataset. Advantageously, such a continuous data collection also allows for identification and correction for updates and changes to the shopping mall interior. Optionally, the dataset once collected is analyzed to allow for more efficient processing thereof. For example, RF fingerprints for intervening spaces are estimated, as are potential sources of error. Further alternatively, similar RF fingerprints are identified to allow for more effective distinction between locations for said similar RF fingerprints. In accordance with yet another embodiment of the invention there is provided a method and system for mapping of interior spaces for each of a plurality devices to build a database of RF fingerprints that are device specific. Further, such a database allows for operation of the system with a multitude of unknown devices by mapping each to a most closely related dataset and/or by developing a transform to transform collected RF fingerprint data to most closely resemble a dataset. Of course, for each of a plurality of standards a single device may be most closely associated with a different dataset—a different device. For example, a smart phone may closely resemble another smart phone in cellular RF signal RF fingerprint while resembling an iPod most closely in WiFi RF fingerprint data.

In accordance with an embodiment of the invention, RF fingerprint data and location data are collected simultaneously in order to allow accurate and effective location estimation based on data later provided from RF devices. Optionally, the data sets are collected from different RF devices of a similar nature such as smart phones. A system as described in FIG. 4 having known devices coupled thereto is used to collect the data. Alternatively, another system is used for data collection. A database is formed comprising data for mapping of one or more building interior. As further data is collected the database and map are optionally updated resulting in a "living database" that changes as the interior of the building is modified. Further, during use, the system, in determining errors and consistent changes, optionally updates the database dynamically to reflect a changing environment and to improve performance and effectiveness for location determination.

Figure 12:
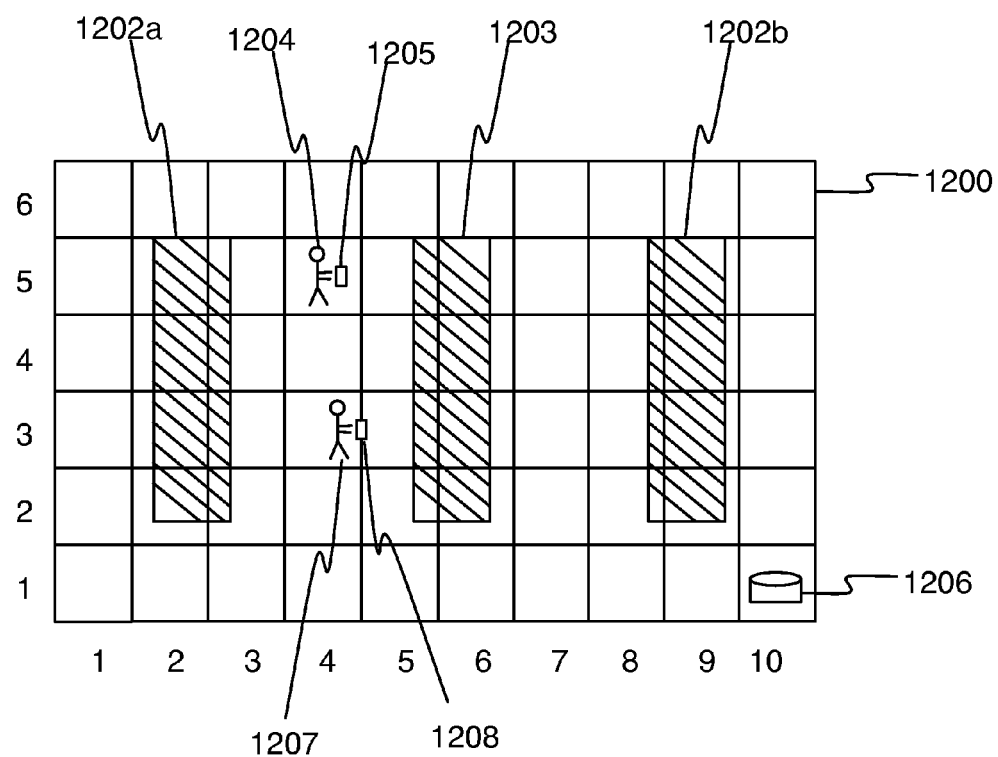
FIG. 12 illustrates RF fingerprint data and location data collected simultaneously in order to allow accurate and effective location estimation based on data later provided from RF devices.

Referring to FIG. 12, shown is a building in the form of a hardware store 1200, wherein RF fingerprint data and location data have been captured, for example using at least one of the methods described hereinabove. Two metal shelves 1202a and 1202b are present at a time RF fingerprint data is collected and is stored in a "living database" on server 1206. A new metal shelf 1203 is subsequently placed on the hardware store floor and therefore RF fingerprint data relating to the metal shelf 1203 are other than stored in the "living database." Person 1204 walks into the hardware store 1200 carrying a device in the form of a 3G cellular phone 1205 comprising RF signal communication circuitry. Upon entry into the hardware store 1200, the 3G cellular phone 1205 is in communication with server 1206 via a LAN to which it transmits RE signal data in the form of 3G data communication signal data and WiFi signal communication data each relating to fingerprints of signals received by the 3G cellular phone 1205. The person 1204 walks through the store to (5,4) close to metal shelf 1203. The new shelf 1203 influences the RF signals received by the 3G cellular phone 1205 at (5,4). The 3G data communication signal data and WiFi signal communication data transmitted by 3G cellular phone 1205 to the server 1206 provide RF fingerprint data for (5,4) that is inconsistent with the data previously stored in the database. Upon determining that the inconsistency is due to a metal object, the server 1206 corrects the error accordingly and stores the error information in the database or associated therewith. A second person 1207 enters the hardware store 1200 with an iPhone® 1208 and walks to (3,4). The iPhone® 1208 is in communication with server 1206 is a similar fashion to the 3G cellular phone 1205 and transmits 3G data communication signal data and WiFi signal communication data to sever 1206 that is inconsistent with the existing data for (3,4). Upon determining that the inconsistency is due to a metal object, the server 1206 corrects the error accordingly and stores error data in the database or alternatively associated therewith. This process repeats N−1 times. An Nth person (not shown) enters the hardware store with an iPad® and walks close to metal shelf 1203. The iPad® is in communication with server 1206 is a similar fashion to the 3G cellular phone 1205 and iPhone® 1208, and transmits 3G data communication signal data and WiFi signal communication data to server 1206 that is inconsistent with the existing data for the Nth person's location; however it is not inconsistent with data previously transmitted by the N−1 RF signal devices and therefore is consistent with the error data. The data provided by the N RF signal devices indicates that a new object is present. The "living database" is updated based on the error data and a metal shelf is added to the hardware store's map. Alternatively, when error data is indicative of something but it is not resolved what that object is, mapping motion of customers about the object helps in determining an appropriate update to mapping data within the database.

Optionally, the RF communication signals are Bluetooth®, 4G or later cellular data signals, other RF signals, and are other than a GPS signal. Optionally the device is a cell phone, tablet, laptop, PDA, or other device comprising at least a receiver circuit for receiving RF signals according to each of at least two standards. Typically, this is achieved using at least two RF signal receiver circuits.

Figure 13:
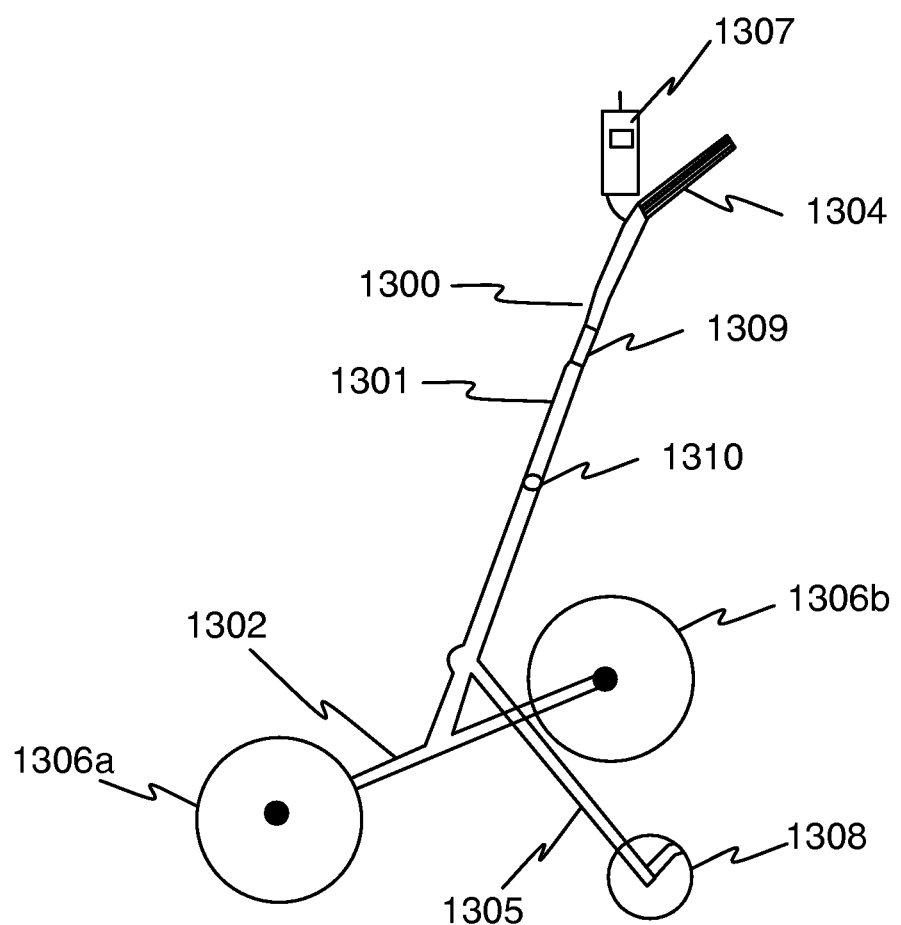
FIG. 13 illustrates a side view of a mapping platform for use in mapping of locations to form a database of locations and associated RF fingerprints therefore.

According to an embodiment of the invention, a mapping platform is used to map the interior of a building. FIG. 13 illustrates mapping platform 1300 comprising stem 1301, crossbar 1302, handle 1304, and arm 1305. Crossbar 1302, handle 1304, and the first end of arm 1305 are coupled to the stem, as shown. Mapping platform 1300 is also comprised of 2 wheels 1306a and 1306b, each coupled to opposite ends of crossbar 1302, and 1 wheel 1308 coupled to the second end of arm 1305, and mobile device 1307, comprising RF communication circuitry. Arm 1305 is coupled to stem 1301 via a apparatus such that the arm 1305 moves in 3 dimensions, x, y, and z. For example the apparatus is a ball and socket joint. Wheel 1308 is coupled to the second end of arm 1305 such that the wheel rotates 360 degrees. For example, the wheel is a castor wheel. Wheels 1306a and 1306b are optically encoded, for example via transmissive optical encoding, and are in communication with the mobile device 1307, for example via Bluetooth®. Alternatively wheels 1306a and 1306b are in communication with the mobile device 1307 via an RS-232 link. Alternatively wheels 1306a and 1306b are optically encoded via reflective optical encoding. A battery compartment 1309 disposed within the stem 1301 comprises batteries for powering the optically encoded wheels 1306a and 1306b. Optionally the batteries power other electronic devices coupled to the stem such as mobile device 1307. The stem 1301 comprises a foldable joint 1310 such that the stem is foldable and made compact for carrying and storage.

Figure 14:
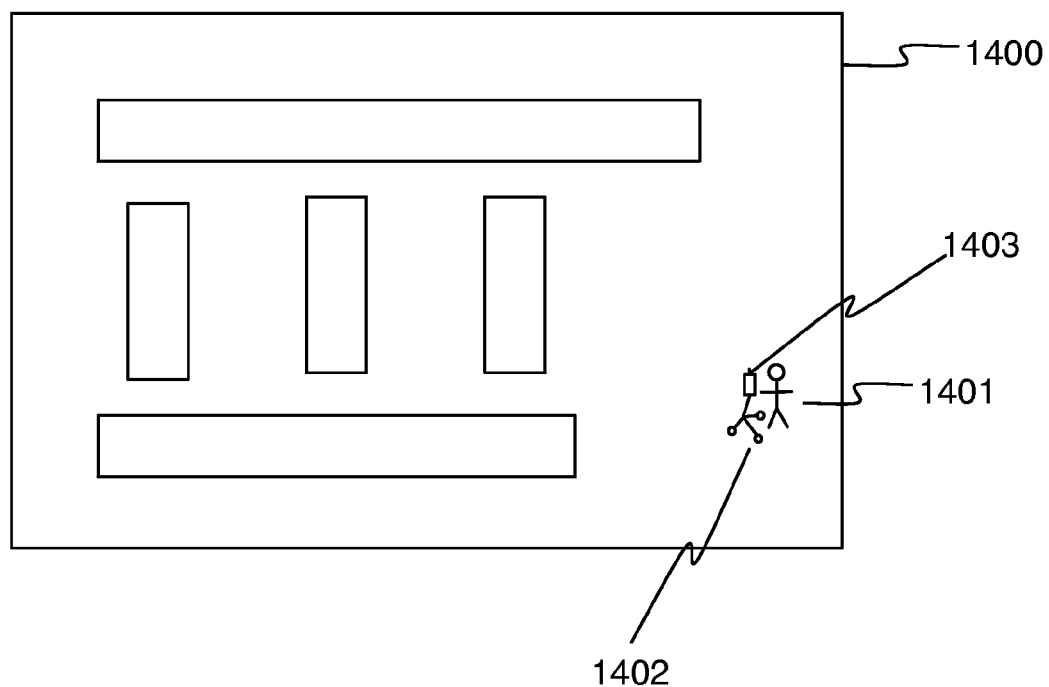
FIG. 14 illustrates a top view of an interior layout of a space.

According to, an embodiment of the invention, a mapping platform is used to map the interior of a building. Referring to FIG. 14, holding the handle of mapping platform 1402 a user 1401 pushes it through the interior of hardware store 1400. Similar to a dead reckoning system, the mapping platform's initial position is known. For example, the initial position is determined by a GPS. As the user 1401 traverses the aisles of the hardware store 1400, a mobile device such as smartphone 1403, gathers RF fingerprint data for each location along the user's path. In parallel, the optically encoded wheels transmit data associated with the distance travelled to smartphone 1403. Two optically encoded wheels is useful when determining distance travelled as they provide more data than a single wheel resulting in increased accuracy of the measured distance. Further, two wheels provides data in relation to turning and so forth. The smartphone 1403 transmits the RF fingerprint data and data associated with the distance travelled to a server to be processed, via a wireless communication system, for example a Wi-Fi network. Alternately the wireless communication system is a cellular network. Arm 1305 freely moves as the user's path changes direction or makes turns providing support and balance to the mapping platform 1402.

Optionally, the mapping platform comprises a compass coupled to the stem for providing directional data to the server via the mobile device. Optionally, the mapping platform comprises an altimeter coupled to the stem for providing altitude data to the server via the mobile device. Altitude data is useful in determining location estimates as the distance travelled will be corrected for uneven surfaces such as a ramp, Optionally three cameras are coupled to the mapping platform and are positioned such that they capture the images in front of the mapping platform and the images on the left and right of the mapping platform. The video data gathered is transmitted to the server for processing via the mobile device. Video data gathered is useful in determining location estimates as images sent from a customer can be compared with images stored in the server database to assist in determining location estimates. Video data is correlated with RF fingerprint and location data to determine location estimates.

Alternatively, the mapping platform comprises a mobile communication device comprising RF communication circuitry to communicate with the server, for example via a Wi-Fi network, to transmit data collected by the mapping platform data gathering devices for example, optically encoded wheels, compass, altimeter and video cameras. The mobile communication device also communicates with the data gathering devices via a wireless communication protocol, for example Bluetooth®. Alternatively, the mobile communication device also communicates with the data gathering devices via a wired communication protocol, for example an RS-232 link. Further alternatively the data collected by the data gathering devices is stored in portable memory, to be extracted and processed at a later time.

Alternatively, the rear wheel in the embodiment of FIG. 13 comprises encoders, for example similar to those on a trackpad or a mouse. Alternatively, the embodiment of FIG. 13 is implemented with included wireless communication circuitry for transmitting data collected thereby. Further alternatively, the wireless mapping platform collects data from a wireless device to which it is coupled and transmits all of the information sensed and collected to a server for storage in an RF fingerprint database. Yet further alternatively, the data is stored within the mapping platform for being transferred to a database at a later time.

Numerous other embodiments of the invention will be apparent to persons skilled in the art without departing from the scope of the invention as defined in the appended claims.

What is claimed is:

1. A method comprising:
   a. receiving at a first electronic device an RF signal comprising a first wireless signal and a second wireless signal, the first wireless signal and the second wireless signal other than solely a UPS signal; and
   b. based on both the first wireless signal and the second wireless signal, determining a region of highest probability comprising an area of location estimates for the electronic device, the determined region of highest probability other than a region of highest probability determinable independently with each of the first RF signal and the second RF signal.

2. A method according to claim 1 wherein the region of highest probability is determined other than relying exclusively on triangulation.

3. A method according to claim 2 wherein the region of highest probability is determined other than relying on triangulation.

4. A method according to claim 1 wherein the region of highest probability includes at least some statistical information relating to a probability of locations within the region.

5. A method according to claim 1 wherein the region of highest probability is other than a regular shape.

6. A method according to claim 5 wherein the region of highest probability is other than one of a circle and a sphere.

7. A method according to claim 1 wherein the first wireless signal and the second wireless signal are received at different times.

8. A method according to claim 7 wherein a velocity value estimation is determined and wherein the region of highest probability is shaped based on a statistical likelihood in dependence upon the velocity, the location estimates, and previous location estimates.

9. A method according to claim 7 wherein path data is determined and the region of highest probability is shaped based on a statistical likelihood dependent upon the path data, the location estimates, and previous location estimates.

10. A method according to claim 1 comprising determining path data for a probable location of the electronic device across different times for which wireless signals are received wherein determining the region of highest probability is further based on the path data.

11. A method according to claim 10 wherein the path data is based on regions of highest probability previously determined for the device.

12. A method according to claim 10 wherein path data is based on a statistical function relating to regions of highest probability previously determined for the device.

13. A method comprising:
   a. receiving at a first electronic device an RF signal comprising a wireless signal according to a first standard and a wireless signal according to a second standard, the first standard and the second standard other than a GPS standard;
   b. determining a first region of highest probability estimate for an electronic device based solely on the wireless signal according to the first standard and determining a second region of highest probability estimate for the electronic device based solely on the wireless signal according to the second standard; and
   c. determining a third region of highest probability of the electronic device based on the first region of highest probability and the second region of highest probability.

14. A method according to claim 13 wherein determining the third region of highest probability comprises: applying a known correlation between the first region of highest probability and the second region of highest probability, the known correlation different for different regions of highest probability.

15. A method according to claim 14 wherein the known correlation is stored within a database and wherein the known correlation comprises additional information, for relating location estimates determinable based on signals according to each of the first and second standards.

16. A method comprising:
   a. receiving at a first electronic device a first wireless signal according to a first standard and receiving at the first electronic device a second wireless signal according to the first standard at a different time temporally proximate to the first wireless signal;
   b. determining a first region of highest probability based on the first wireless signal and determining a second region of highest probability based on the second wireless signal; and
   c. determining the third region of highest probability of the electronic device based on the first region of highest probability and the second region of highest probability.

17. A method comprising:
   a. receiving at a first electronic device a first wireless signal according to a first standard and receiving at the first electronic device a second wireless signal according to the first standard at a different time temporally proximate to the first wireless signal;
   b. receiving at the first electronic device a second first wireless signal according to a first standard and receiving at the first electronic device a seconds second wireless signal according to the first standard at a different time temporally proximate to the first wireless signal and second wireless signal;
   c. determining a first region of highest probability based on the first wireless signal and second wireless signal and determining a second region of highest probability based on the second first wireless signal and second second wireless signal; and
   d. determining the third region of highest probability of the electronic device based on the first region of highest probability and the second region of highest probability.

18. A method comprising:
   a. receiving at a first electronic device a first wireless signal according to a first standard and receiving at the first electronic device a second wireless signal according to the first standard at a different time temporally proximate to the first wireless signal;
   b. receiving at the first electronic device a second first wireless signal according to the first standard and receiving at the first electronic device a second second wireless signal according to the first standard at a different time temporally proximate to the first wireless signal and second wireless signal;
   c. determining a first region of highest probability based on the first wireless signal, a second region of highest probability based on the second wireless signal, a second first region of highest probability based on the second first wireless signal and a second second wireless signal based on the second second wireless signal; and
   d. determining a third region, of highest probability of the electronic device based on the first region of highest probability, the second region of highest probability, the second first region of highest probability, and the second second region of highest probability.

19. A method comprising:
   a. receiving at a first electronic device a first wireless signal according to a first standard and receiving at the first electronic device a second wireless signal according to the first standard;
   b. determining a second measured time based on a difference between a second time associated with a second region of highest probability and a third time associated with a third region of highest probability;
   c. determining a velocity value based on the second measured time; and
   d. determining another region of highest probability based on the first wireless signal, the second wireless signal, the second measured time, and the velocity value.

20. A method according to claim 19 comprising determining a velocity function for a plurality of probable locations of the electronic device across different times for which wireless signals are received wherein determining a third region of highest probability is based on a velocity value based on the velocity function.

21. A method according to claim 20 wherein determining the velocity function comprises determining acceleration data.

22. A method according to claim 21 wherein determining the third region of highest probability is further based on the acceleration data.

23. A method comprising:
   a. receiving at a first electronic device a first wireless signal and a second wireless signal;
   b. determining using RF fingerprinting a first region of highest probability based on the first wireless signal;

c. determining using RF fingerprinting a second region of highest probability based on the second wireless signal; and
d. determining based on the first and second regions of highest probability a third region of highest probability for the electronic device.

\* \* \* \* \*